United States Patent [19]

Lakiza et al.

[11] 4,127,080
[45] Nov. 28, 1978

[54] TUBULAR SHAFT OF A MARINE LINE SHAFTING

[76] Inventors: Rostislav I. Lakiza, ulitsa L. Tolstogo, 20, kv. 14; Viktor I. Podbeltsev, ulitsa Bolshaya Morskaya, 38, kv. 4, both of Sevastopol, U.S.S.R.

[21] Appl. No.: 775,594

[22] Filed: Mar. 8, 1977

[51] Int. Cl.² .......................................... B63H 23/34
[52] U.S. Cl. ..................................... 115/76; 64/1 C; 115/34 R
[58] Field of Search ................... 115/34 R, 34 C, 76; 64/1 R, 1 C, 1 S, 1 V

[56] References Cited

U.S. PATENT DOCUMENTS

| 569,116 | 10/1896 | Morison | 64/1 S |
|---|---|---|---|
| 1,627,936 | 5/1927 | Swenson | 64/1 V |
| 1,664,713 | 4/1928 | Strickland | 64/1 V |
| 2,873,587 | 2/1959 | Lyritzis | 64/1 R |
| 3,466,895 | 9/1969 | Cartwright | 64/1 R |
| 3,580,214 | 5/1971 | Muller | 115/34 R |

FOREIGN PATENT DOCUMENTS 1,123,737 6/1956 France ............................... 64/1 S Primary Examiner—Trygve M. Blix
Assistant Examiner—Sherman D. Basinger
Attorney, Agent, or Firm—Fleit & Jacobson

[57] ABSTRACT

The tubular shaft of a marine line shafting, comprising at least two coaxial tubes twisted around their own axis in opposite directions establishing stresses therein not going beyond the elastic strain limit. Each of the tubes is provided with flanges fixed thereto on at least one end thereof, the flanges serving as a shaft extension. The flanges are interconnected and keep the tubes in the twisted state.

5 Claims, 4 Drawing Figures

TUBULAR SHAFT OF A MARINE LINE SHAFTING

BACKGROUND OF THE INVENTION

1. Field of the Invention

The present invention relates to the trade of shipbuilding and more specifically, to tubular shafts used in marine line shaftings.

The proposed invention is useful in propulsion and tunnel shafts of a ship's line shafting.

The present invention is also applicable in machine building and mechanical engineering practice, whenever it becomes necessary to impart high torque from the drive to the actuator mechanism using low weight line shafting.

2. Description of the Prior Art

It is known to use hollow (tubular) shafts for marine line shaftings, made of a solid forged piece by drilling out the centre (core) thereof. The disadvantage inherent in such a construction is the high labour consumption of the shaft production process and low material utilization factor.

It is also known to use tubular shafts made as a tube with tailpieces or extensions welded thereto, such as flanges or tapered extensions for setting the propeller screw and clutch member thereon. The disadvantage said shafts suffer from resides in their inability to impart high torque this being due to the fact that the present day level of production engineering can afford neither rolling nor drawing a tube of the required size and strength.

Known in the trade are prior-art shafts of marine line shaftings, made a multiple-layer shell built up of coaxially arranged tubes differing in diameter and length.

To unite the tubes into an integral structure the shaft has endpieces or extensions provided with stepwise annular recesses made to suit the diameter of each tube.

The end pieces of the tubes are taper-turned so as to fit into the respectively profiled annular recesses of the shaft extension. In addition, the shaft extension has an interior stepped chamber adapted to be closed by a threaded plug. Once the shaft has been assembled with the tubes, the interior stepped chambers in the shaft extensions are filled with asphalt compound urged under pressure developed by a thrust screw turnable into the threaded plug. It is under the pressure exerted that the walls of the shaft extension are deformed, thus establishing a tight fit of the tube ends in the recesses of the shaft extension. To minimize torsional vibrations, the intertube gaps are filled with an elastic silicone resin.

However, a simultaneous press-fitting of the tube ends by virtue of the pressure built up in the shaft extension precludes one from consecutively checking the end of each tube for quality of securing, whereby the whole structure cannot be regarded as reliable.

Moreover, provision of an interior chamber in the shaft extension is found to be difficult in cases where the propulsion shaft is to terminate in a tapered extension to fit the propeller screw thereon.

One more type of shaft used in marine line shafting is known to comprise coaxially arranged tubes of different diameter and length fitted over the shaft extensions and welded thereto.

In this case the shaft extensions have cylindrical stepwise recesses made to suit the tube bore diameter. The tubes are welded to the shaft extensions in succession, i.e., first the inner tubes, then the outer ones. To render the tubes weldable to the other shaft extension after the inner tube has been welded thereto, each of the outer tubes is consecutively extended by welding two-half inserts thereto.

To minimize torsional vibrations the intertube space is filled with silicone resin or plastics.

The disadvantage of said shafts resides in a multitude of weld joints which involve successive checkup and heat treatment to relieve stresses. Furthermore, filling of the interior spaces with cold-cure plastics or with resin following the welding of the outside tubes is impeded, while gradual filling of the spaces is precluded by heating due to welding and heat treatment of the outside tubes.

Moreover, torque-developed tangential stresses being distributed in direct proportion to the length of radius, a majority of torsional load stresses developed in the tubular shafts are taken up by the outer tubes, while the inner ones remain underloaded which results in an increased quantity of tubes used, larger mass of the shaft and higher labour consumption for its manufacture.

There are likewise known tubular shafts composed of a number of coaxial tubes, of which inner ones are to take up an additional torque load. This is attained as follows.

The endpieces of the coaxially arranged tubes carry disks spaced somewhat apart from the tube butt end and welded thereto, said disks having involute teeth with the same pitch circle diameter. Each of the outer tubes with its butt end thrusts against the disks welded to the inner tube which prevents axial displacement of the shorter outer tubes with respect to the inner ones. The involute teeth of the disks differ in thickness, i.e., the maximum-thickness teeth are in the disk welded to the innermost tube, while the disk welded to each of the next outer tubes has thinner teeth than the disk welded to the preceding inner tube.

Fitted onto the shaft extensions are clutches with internal involute toothing featuring the same thickness over the entire clutch length and adapted to get in mesh with the teeth of the disks welded to the tubes. The clutches are held in position on the outermost tube by nuts. One of the clutches has a flange for a conventional joining with the propulsion shaft or with the flange of the drive shaft. The other clutch engages the teeth of the disks welded to the tubes of the next tubular shaft. The intertube space is filled with an elastic silicone resin which adheres firmly to the tube surface.

The shaft of the character set forth above functions as follows. Owing to the fact that the teeth of the disks welded to the inner tubes are thicker than those of the disks welded to the outer tubes, it is the former teeth that are the first to take up torsional load. As soon as the innermost tube has been twisted to an angle corresponding to the clearance in the clutch engagement with the next disks, the load is taken by the next outer tube. Upon further twisting the load is taken up by the further outer tube so that at a rated torque all tubes are loaded nearly uniformly.

The disadvantage of the afore-described shaft construction resides in an inadequate rigidity of the shaft operating under variable load conditions, and especially under torsional vibrations, as well as in rendering the outer tubes beyond taking up torsional load in case of transmitting torque lower than the rated one. When under variable loads the tubes are set in vibration which is only partially damped by the elastic silicone resin that interconnects the tubes. As the ship's line shafting does not operate under the rated load at all times, the teeth of the disks set on the inner tubes are liable to heavier wear than those of the disks set on the outer tubes which results in reduced thickness thereof and, consequently, in lower loads taken up by the inner tubes. Variable loads taken up primarily by the inner tubes involve higher margin of safety thereof which precludes uniform load distribution between the inner and outer tubes.

Sophisticated construction of such shafts and necessity for the disks to be welded to the tubes after tooth cutting fails to provide adequate accuracy of the clearances between the teeth of the disks and the clutches, whereas tooth cutting made after welding the disks to the tubes requires unique equipment and fails to provide accurate tooth cutting due to inadequate rigidity of the entire construction.

Furthermore, it is due to the fact that the stressed condition of the tubes is established only when under working load that control over the uniform loading of the tubes proves to be difficult.

The shaft features but low level of repairability as being of inseparable construction.

SUMMARY OF THE INVENTION

It is an essential object of the present invention to provide a tubular shaft of a marine line shafting featured by an increased load capacity due to redistributed tangential loads imposed upon the shaft outer and inner tubes and establishing tangential prestresses in the outer tubes adapted to take up a principal part of the load, said prestresses being directed oppositely to tangential stresses resulting from the effect of rated torque.

Said objects are accomplished due to the fact that in a tubular shaft of a marine line shafting, comprising at least two coaxial tubes at the end of which the tubular shaft extensions are secured, said tubes are twisted round their own axis in the opposite directions till developing such stresses therein that are within an elastic strain limit, and in that flanges are held to each of the tubes on at least one side thereof, said flanges serving as the shaft extensions and having means adapted to interconnect said flanges and keep the tubes in the twisted state.

Establishing tangential stresses in the outer tube due to twisting the latter during assembly, which are directed oppositely to the tangential stresses resulting from the effect of rated torque, enables the tube to take up torque higher than rated torque for a similar tube not prestressed.

Thus, the tubular shaft pretwisted within an elastic strain limit is capable of taking up a higher load directed oppositely to pretwisting moment than the shaft not prestressed by applying torsional load thereto. This fact is accounted for by redistributed stresses and establishing additional stresses in usually under-loaded inner tubes.

It is expedient that the shaft of a marine line shafting should be provided with elastic supports located in the annular space confined between the outer and inner tubes.

Said elastic supports add to the rigidity of the shaft, reduce its vibration and do not interfere with the shaft dismantling for repairs.

It is likewise favourable that the tubular shaft of a marine line shafting should be provided with flanges held in place to one of the shaft extensions, whereas the outer tube of the other shaft extension is reasonable to be rigidly interconnected with the flange, and the flanges of the inner tubes should be mounted movable so that they should be free to move axially with respect to the outer tube flange.

Such fixing of the inner flanges at one of the shaft ends precludes the onset of tension stresses in the outer tube and compression stresses in the inner tubes, resulting from interconnection of the flanges.

It is appropriate that the inner tubes should be made splined by making the corresponding splines in the flanges, said splines being reasonable to be cut on sleeves, and the latter be expedient to secure in place on the tubes by, say, welding.

Flange-to-tube joints are ready-to-make and provide for axial travel of the flange to impart torque to the tube.

BRIEF DESCRIPTION OF THE DRAWING

Given below is a detailed description of a specific embodiment of the present invention represented by way of illustration with reference to the accompanying drawings, wherein.

DESCRIPTION OF THE PREFERRED EMBODIMENT

Figure 1:
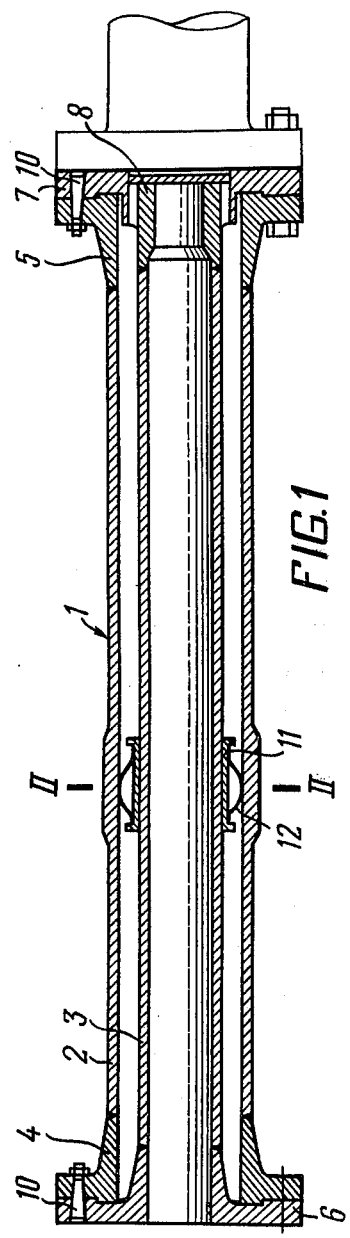
FIG. 1 is a sectional view of a tubular shaft of a marine line shafting.
Figure 2:
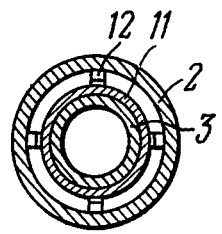
FIG. 2 is a section taken along the line II—II in FIG. 1.

Reference being now directed to the accompanying drawings, FIGS. 1 and 2 represent a tubular shaft 1 of a marine line shafting of the herein-proposed construction to comprise at least two coaxially arranged tubes. For the sake of simplicity in description FIG. 1 shows two tubes only though practically more than two tubes may be used.

An outer tube 2 accommodates an inner tube 3.

Flanges 4 and 5 are fixed by, say, welding at the ends of the outer tube 2.

Flanges 6 and 7 are provided at the ends of the inner tube 3, of which the flange 6 is secured in position by, say, welding, while the flange 7 is movably mounted to the inner tube 3 so as to axially travel with respect to the flange 5 of the outer tube 2. Practically, movable fit of the flange 7 of the inner tube 3 with respect to the flange 5 of the outer tube 2 can be attained by many different ways.

In the herein-disclosed specific embodiment of the present invention this is attained due to a splined joint.

For convenience in making the splines they are cut on a sleeve 8 which is then welded to the end of the inner tube 3. If more than one inner tube 3 is provided, the sleeves 8 are welded to each of the inner tubes. The flange 7 has also splines adapted to engage the splineways of the sleeve 8, thus rendering the joint movable.

Figure 3:
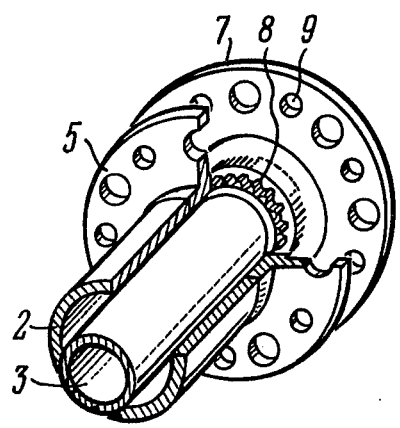
FIG. 3 is a perspective view of the shaft extension representing a splined joint of the flange with the inner tube.

The flanges 5 and 7 of the outer tube 2 and the inner tube 3, respectively have holes 9 (FIG. 3) to accommodate means for interconnecting said flanges, said means being, say, bolts 10 (FIG. 1).

The bolts 10 join the flanges 5, 7 of the tubes 2, 3 together after the outer tube 2 and the inner tube 3 have been twisted relative to each other till stresses are established therein not exceeding an elastic strain limit. Provision of the flanges 7 of the inner tubes 3 movable makes it possible to avoid tension stresses in the outer tubes 2 and compression stresses in the inner tubes 3 that are liable to occur when joining the flanges 5 and 7 together.

Figure 4:
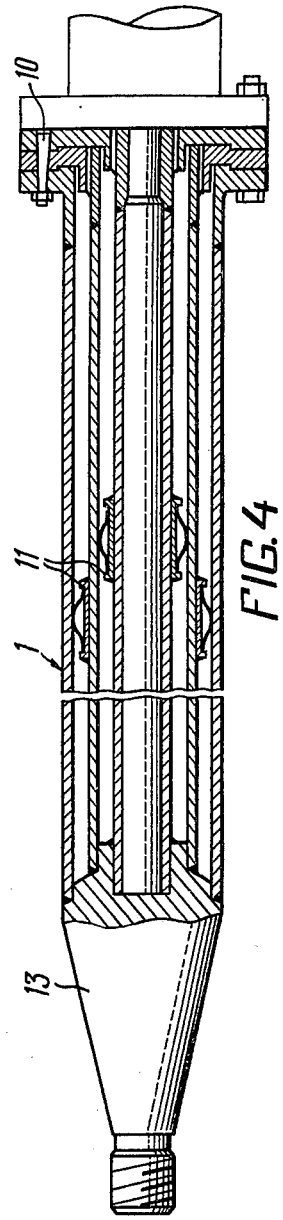
FIG. 4 is an embodiment of the tubular shaft of the invention as made up of a number of tubes and featuring the tapered end for fitting the propeller screw thereon.

When interconnected by the bolts 10 the flanges 5 and 7 serve as the extension of the shaft 1 and provide interconnection of shafts to make up a marine line shafting. In addition, the shaft 1 may also be used as a propulsion shaft; this being the case, one of its extensions is made suitable for fitting the propeller screw thereon as shown in FIG. 4.

Prior to assembling the tubular shaft, an elastic support 11 (FIGS. 1, 2) has been mounted and fixed in position by, say, welding, said support being provided with springs 12. Such an arrangement of the elastic support 11 provides for damping of vibrations but does not interfere with dismantling of the tubular shaft 1.

The tubular shaft of the invention is assembled in the following way.

The inner tubes 3 are fitted one by one into the outer tube 2, access being gained at the end of the flanges 4, 6 fixed in position on the tubes, whereupon the tubes 3 are deadly interconnected by the bolts 10. The thus-assembled shaft is secured, through the flanges 4, 6, on the assembly plate (not shown). Next the flanges 7 are fitted onto the sleeves 8 of the inner tubes 2, whereupon fixed on the flanges 7 is a device (not shown) capable of imparting the required torque thereto. It is due to said device that each of the flanges 7 is made to turn along with the sleeve 8 and the end of the inner tube 3 to a certain predetermined angle.

The abovesaid angle of turn is determined proceeding from the conditions that the tangential stresses effective in the inner tube 3 should not go beyond the elastic strain limit which depends, in every particular case, upon the material the tubes are made from.

The twisting process is checked against the marks preliminarily made on the flanges 5 and 7.

Once the preset angle of twist and level of stresses in the inner tube 3 have been attained, the flange 7 of the inner tube 3 is drawn and held by the bolts 10 to the flange 5 of the outer tube 2, so that the flanges 5 and 7 held together make up the extension of the shaft 1.

Once the twisting load has been released from the flange 7, the inner tube 3 gets untwisted by virtue of elastic forces, thus twisting the outer tube 2 in the opposite direction until the tangential stresses effective in the tubes 2 and 3 gets equalized.

The stresses are checked against, say, strain gauges provided on the outer tube 2 and the inner tube 3.

Whenever it becomes necessary to provide a tubular shaft composed of more than two tubes, further tubes may be inserted into the shaft, twisted one by one and assembled with the help of the flanges 7 and the bolts 10.

If necessary the propulsion shaft 1 may be made by the same way, wherein one of its extensions is to have a tapered end 13 for the propeller screw to fit thereon. Such a shaft is represented in FIG. 4.

In this case the inner tubes and the outer tube of the shaft 1 are welded in succession, beginning with the innermost tube, whereupon the flanges of the opposite shaft extension are assembled, starting with the flange following that welded to the outer tube.

Twisting of the tubes of the shaft 1 is carried out as described above.

It is due to tangential stresses established in the outer tube of the shaft 1 during assembly and directed oppositely to those resulting from the effect of the torque developed by the rotating shaft that the latter can take up torque higher than the one estimated for not prestressed tubes.

Thus, the pretwisted shaft will be able to take up higher load opposite to the torque developed by pretwisting than the shaft not given torsional prestresses.

The proposed shafts are especially recommended for use in line shaftings provided with variable-pitch screws, wherein the shafts must be hollow for the working members of the pitch control mechanism to pass and feature unidirectional rotation.

Moreover, such shafts may be made use of in fixed-pitch propeller screws as well, as astern torque developed by such propeller screws is much lower than the rated ahead torque.

What we claim is:

1. A tubular shaft of a marine line shafting comprising:
    an inner torsionally prestressed tube formed of a plurality of coaxial tubular members;
    an outer torsionally prestressed tube coaxial with and spaced from said inner tube and being formed of a plurality of coaxial tubular members, the torsional prestress in said outer tube being equal to and opposing the torsional prestress in said inner tube;
    flanges connected to first respective ends of each of said tubes and to each other for interconnecting said tubes and for forming an extension of the tubular shaft;
    interconnecting means for interconnecting the other respective ends of each of said tubes and for keeping said tubes torsionally prestressed, said tubes being torsionally prestressed by rotating said inner tube in a first direction before said interconnecting means interconnects said other respective ends, said interconnecting means including a plurality of splines, said splines being connected to ends of said tubular members, the ends of splines connected to the tubular members forming the inner tube being connected in such manner that the ends of the tubular members are free to travel axially; and
    elastic support means positioned in an annular space defined between said inner and outer tubes for damping vibrations of the tubular shaft.

2. A tubular shaft as claimed in claim 1 wherein said tubular members forming the inner tube are spline-associated with their respective flanges.

3. A tubular shaft of a marine line shafting, comprising:
    an inner pretwisted tube;
    an outer pretwisted tube coaxial with the inner tube, the pretwisting of the outer tube being equal and oppositely directed to that of the inner tube;
    a connection extension having a fitting seat and stepped recesses for first ends of said inner and outer tubes which are welded to said connection extension;
    connection means for interconnecting the opposite ends of each of said inner and outer tubes and for ensuring the pretwisting of tubes, comprising: a flange rigidly fixed by welding to the outer tube; a flange fixed to the inner tube so as to be able to travel axially; fixation means for interconnecting said flanges; said tubes being twisted by prerotating the inner tube in one direction after the tubes are welded onto said connection extension and before said connection means are interconnected; and elastic bearing means disposed in an annular space between the inner and outer tubes.

4. A tubular shaft of a marine line shafting comprising:

an inner torsionally prestressed tube;

an outer torsionally prestressed tube coaxial with and spaced from said inner tube, the torsional prestress in said outer tube being equal to and opposing the torsional prestress in said inner tube;

flanges connected to first respective ends of each of said tubes and to each other for interconnecting said tubes and for forming an extension of the tubular shaft;

interconnecting means for interconnecting the other respective ends of each of said tubes and for keeping said tubes torsionally prestressed, said tubes being torsionally prestressed by rotating said inner tube in a first direction before said interconnecting means interconnects said other respective ends, said interconnecting means including a first flange rigidly connected to said other respective end of the outer tube and a second flange connected to said first flange and connected to said other respective end of the inner tube in such manner that the end of the inner tube is free to axially travel with respect to said first flange; and elastic support means positioned in an annular space defined between said inner and outer tubes for damping vibrations of the tubular shaft.

5. A tubular shaft as claimed in claim 4, wherein said inner tube is spline-associated with said second flange.

* * * * *